US012749974B2

(12) United States Patent
Alladi et al.

(10) Patent No.: US 12,749,974 B2
(45) Date of Patent: Sep. 29, 2026

(54) DC-TO-DC CONVERTER AND CONFIGURABLE OUTPUT MAGNITUDE AND POLARITY

(71) Applicant: Hamilton Sundstrand Corporation, Charlotte, NC (US)

(72) Inventors: Pranay kumar Alladi, Kamareddy (IN); Shivani Lingannagari, Komarrambheem (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 214 days.

(21) Appl. No.: 18/627,644

(22) Filed: Apr. 5, 2024

(65) Prior Publication Data

US 2025/0023470 A1 Jan. 16, 2025

(30) Foreign Application Priority Data

Jul. 10, 2023 (IN) ............................ 202311046249

(51) Int. Cl.

*H02M 3/158* (2006.01)
*H02M 1/00* (2006.01)
*H02M 3/00* (2006.01)
*H02M 3/155* (2006.01)

(52) U.S. Cl.

CPC ......... *H02M 3/158* (2013.01); *H02M 1/0095* (2021.05); *H02M 3/005* (2013.01); *H02M 3/1557* (2021.05); *H02M 3/1582* (2013.01)

(58) Field of Classification Search

CPC .... H02M 3/156; H02M 3/158; H02M 3/1588; H02M 3/01; H02M 3/1557; H02M 1/0095; H02M 3/005; H02M 3/1582

See application file for complete search history.

(56) References Cited

U.S. PATENT DOCUMENTS 7,660,138 B2 2/2010 Hallak
9,178,427 B1 * 11/2015 Szolusha .............. H05B 45/375
10,348,205 B1 * 7/2019 Mednik ................. H02M 3/158
10,763,748 B2 9/2020 Shumkov et al.
(Continued)

OTHER PUBLICATIONS

European Search Report for Application No. 24187481.7, mailed Dec. 9, 2024, 9 pages.
(Continued)

*Primary Examiner* — Gary L Laxton
(74) *Attorney, Agent, or Firm* — CANTOR COLBURN LLP

(57) ABSTRACT

A DC-to-DC converter includes an input configured to receive a DC input voltage, an output having a positive rail and a negative rail, wherein the negative rail is configured for connection to a negative terminal of the DC input voltage source, a bypass capacitor having first end connected to a first node and a second end connected to a second node and two coupled inductors, the two coupled inductors including a first inductor that has a first end connected to the input and a second end connected to the first end of the bypass capacitor at the first node, the two coupled inductors also including a second inductor that has a first end connected to the second end of the bypass capacitor at the second node and a second end connected to a third node. The converter includes switches that allow control of the polarity and magnitude of the output.

15 Claims, 8 Drawing Sheets

(56) References Cited

U.S. PATENT DOCUMENTS

| | | | | |
|---|---|---|---|---|
| 11,296,602 | B2 | 4/2022 | Somani et al. | |
| 11,381,171 | B2 | 7/2022 | Somani et al. | |
| 2010/0039080 | A1 | 2/2010 | Schoenbauer et al. | |
| 2014/0167715 | A1 * | 6/2014 | Wu | H02M 7/537 323/271 |
| 2022/0407423 | A1 * | 12/2022 | Chen | H02M 3/1586 |
| 2023/0037874 | A1 * | 2/2023 | Petersen | H02M 3/07 |
| 2025/0132674 | A1 * | 4/2025 | Khan | H02M 1/009 |

OTHER PUBLICATIONS

Kumar Ashok et al. "Derivation of Single-Stage Single -Phase Fourth Order Buck-boost Inverters", 2018 IEEE International Conference on Power Electronics, Drives and Energy Systems (PEDES), IEEE, Dec. 18, 2018, pp. 1-6.

European Office Action for Application No. 24187481.7, mailed Nov. 17, 2025, 7 pages.

Rashid Muhammad H, Dec. 31, 2010 (Dec. 31, 2010), Power Electronics Handbook : Devices, Circuits, and Applications, Elsevier/Bh, Butterworth-Heinemann, Amsterdam [U.A.], 1409 pages, (divided into three parts, attached herewith).

* cited by examiner

DC-TO-DC CONVERTER AND CONFIGURABLE OUTPUT MAGNITUDE AND POLARITY

CROSS-REFERENCE TO RELATED APPLICATIONS

This application claims the benefit of Indian patent application No. 202311046249 filed Jul. 10, 2023, the disclosure of which is incorporated herein by reference in its entirety.

BACKGROUND

The present disclosure relates generally to power converters and, in particular, to DC-to-DC converters.

Switched mode DC-to-DC converter power supplies are widely used to convert power from a source, such as mains power, to DC power supply for electronic devices.

Modern embedded control systems may need to provide power at several different levels. In aerospace a typical standard voltage available is 28V (or 48V). This voltage may need to be stepped up or down depending on what type of load is driven. Also, another requirement may be that the DC-to-DC converter to provide both positive and negative voltage outputs (bipolar topology).

SUMMARY

According to one embodiment a DC-to-DC converter is disclosed. The converter includes: an input configured to receive a DC input voltage: an output having a positive rail and a negative rail where in the negative rail is configured for connection a negative terminal of the DC input voltage: a bypass capacitor having first end connected to a first node and a second end connected to a second node; and two coupled inductors. The two coupled inductors including a first inductor that has a first end connected to the input and a second end connected to the first end of the bypass capacitor at the first node, the two coupled inductors also including a second inductor that has a first end connected to the second end of the bypass capacitor at the second node and a second end connected to a third node. The converter also includes: a first switch (S1) connected between the first node and the negative rail; a second switch (S2) connected between the second node and the positive rail: a third switch (S3) connected between the second node and the negative rail; a fourth switch (S4) connected between the third node and the negative rail; and a fifth switch (S5) connected between the third node and the positive rail. The converter further includes: a controller that selectively operates the first, second, third, fourth and fifth switches based on a desired magnitude and polarity of a voltage at the output.

In addition to one or more of the features described above, or as an alternative to any of the foregoing embodiments, the controller can operate in an inverting mode at a switching frequency having a period.

In addition to one or more of the features described above, or as an alternative to any of the foregoing embodiments, in the inverting mode, the second and fourth switches S2 and S4 are open and the fifth switch S5 is closed.

In addition to one or more of the features described above, or as an alternative to any of the foregoing embodiments, in the inverting mode the first and third switches operate in a complementary manner during the period.

In addition to one or more of the features described above, or as an alternative to any of the foregoing embodiments, a portion of the period where the first switch is closed defines a duty cycle D.

In addition to one or more of the features described above, or as an alternative to any of the foregoing embodiments, when D is less than 0.5 a voltage at the input is stepped-down to a lower voltage at the output and when D is greater than 0.5 the voltage at the input is stepped-up to a higher voltage at the output.

In addition to one or more of the features described above, or as an alternative to any of the foregoing embodiments, a relationship between the DC input voltage ($V_{in}$) and the output voltage ($V_{out}$) is:

$$V_{out} = -V_{in}\frac{D}{1-D}.$$

In addition to one or more of the features described above, or as an alternative to any of the foregoing embodiments, the controller can operate in a non-inverting mode at a switching frequency having a period.

In addition to one or more of the features described above, or as an alternative to any of the foregoing embodiments, in the non-inverting mode, the third and fifth switches S3 and S5 are open and the fourth switch S4 is closed.

In addition to one or more of the features described above, or as an alternative to any of the foregoing embodiments, in the non-inverting mode the first and second switches operate in a complementary manner during the period.

In addition to one or more of the features described above, or as an alternative to any of the foregoing embodiments, when D is less than 0.5 a voltage at the input is stepped-down to a lower voltage at the output and when D is greater than 0.5 the voltage at the input is stepped-up to a higher voltage at the output.

In addition to one or more of the features described above, or as an alternative to any of the foregoing embodiments, a relationship between the DC input voltage ($V_{in}$) and the output voltage ($V_{out}$) is:

$$V_{out} = V_{in}\frac{D}{1-D}.$$

Also disclosed is a method of operating a power converter according to any embodiment disclosed herein. The method includes: determining if the power converter is to operate in an inverting mode or an inverting mode; and operating the power converter at a switching frequency having a period.

In addition to one or more of the features described above, or as an alternative to any of the foregoing embodiments, in the method when in the inverting mode, the second and fourth switches S2 and S4 are open and the fifth switch S5 is closed and the first and third switches operate in a complementary manner during the period.

In addition to one or more of the features described above, or as an alternative to any of the foregoing embodiments, in the method a portion of the period where the first switch is closed defines a duty cycle D and wherein when D is less than 0.5 a voltage at the input is stepped-down to a lower voltage at the output and when D is greater than 0.5 the voltage at the input is stepped-up to a higher voltage at the output.

In addition to one or more of the features described above, or as an alternative to any of the foregoing embodiments, in the method the relation between the DC input voltage ($V_{in}$) and the output voltage ($V_{out}$) is:

$$V_{out} = -V_{in}\frac{D}{1-D}.$$

In addition to one or more of the features described above, or as an alternative to any of the foregoing embodiments, in the method when in the non-inverting mode, the third and fifth switches S3 and S5 are open and the fourth switch S4 is closed and the first and second switches operate in a complementary manner during the period.

In addition to one or more of the features described above, or as an alternative to any of the foregoing embodiments, in the method a portion of the period where the first switch is closed defines a duty cycle D and wherein when D is less than 0.5 a voltage at the input is stepped-down to a lower voltage at the output and when D is greater than 0.5 the voltage at the input is stepped-up to a higher voltage at the output.

In addition to one or more of the features described above, or as an alternative to any of the foregoing embodiments, in the method a relationship between the DC input voltage ($V_{in}$) and the output voltage ($V_{out}$) is:

$$V_{out} = V_{in}\frac{D}{1-D}.$$

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings, in which:

DETAILED DESCRIPTION

Figure 1:
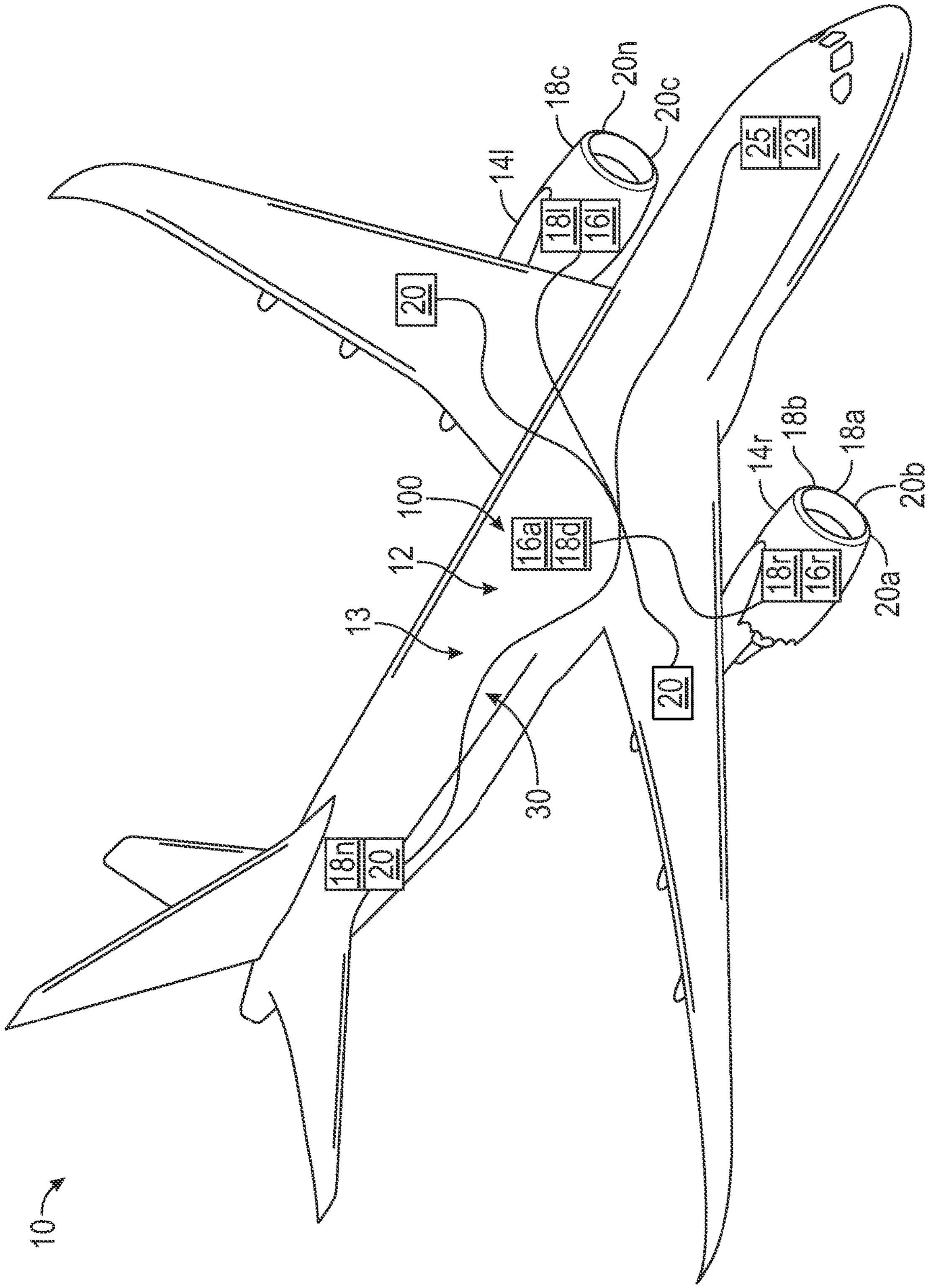
FIG. 1 depicts an example of an aircraft with controller and electrical power systems in accordance with an exemplary embodiment.

For the purposes of promoting and understanding the principles of the present disclosure, reference will now be made to the embodiments illustrated in the drawings, and specific language will be used to describe the same. It should nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and/or a direct "connection" unless specified to the contrary in the claims below.

In general, embodiments herein relate to an application of a DC-to-DC converter that can provide both positive and negative polarity outputs and can step the output up or down. That is, the illustrated converter can operate in both inverting and non-inverting modes. In both the modes the input voltage can be stepped up or down.

The described embodiments are explained with respect to an example DC-DC converter. In one embodiment, the converter can consist of 5 switches (S1-S5 below), at least one capacitor and two inductors. The inductors can be coupled inductors.

Herein, the converter will be described as having two modes, inverting and non-inverting. In each mode, three of the switches are held in a constant state (open/non-conducting or closed/conducting). In particular, two switches of the three switches are OFF, and the other switch is ON. Herein, the terms ON relative to a switch (e.g., a transistor) means the switch is conducting and OFF means that the switch is not conducting.

In one embodiment, in each mode the other two switches are then operated in opposing manners. That is, while one of the switches is ON, the other is OFF. For a given time period, one of the switches will be on and the other off. The ratio that one of the switches is ON relative to the time period is the duty cycle (D) of the circuit. D is used below and is based on the time S1 is on relative to the time period (or period). As illustrated below, D defines and amount that voltage is stepped up or down.

Further, in one embodiment, based on the positions of the stitches, the output terminal can be configured for both positive and negative output voltages.

Referring to FIG. 1, an aircraft 10 is shown. Aircraft 10 includes one or more control systems shown generally as 12. The control system 12 may include a power system 13 that interconnects with one or more controllers referred to generally as 16 and more specifically as 16*l*, 16*r* commonly located at or near each engine 14*l*, 14*r*. Other controllers 16 are also be depicted in this instance as 16*a*, 16*b*, and the like. In the described embodiments, the reference numerals are annotated with an "l" or "r" to denote the left or right side of the aircraft 10, respectively, for the purpose of simplicity of description. Likewise, the annotation "a", "b", . . . "n" is employed to simplify designation of a multiple enumeration of a component or element.

Each of the controllers 16 may be configured to receive various sensor signals from sensors referred to generally as 18 and individually as 18*a*, 18*b*, . . . 18*n* all over the aircraft 10 and may also operate one or more actuators shown generally as 20, and more specifically as 20*a*, 20*b*, 20*c*, . . . 20*n* to control the operation of the engines 14*r*, 14*l*, flight controls, (not shown), power systems 13 and the like. The control system 12 and power system 13 may also be operably connected to various other components throughout the aircraft 10, including, but not limited to other controllers 16, control panels 23, displays 25, and the like. Some controllers 16 e.g., 16*a* may also be configured to receive power from various aircraft sources, e.g., generators, batteries and the like and distribute power as needed to various systems in the aircraft 10.

The power system 13 may be part of a controller 16. In yet another embodiment, the configuration could be the opposite with the controller 16 operating as or providing a portion of the power system 13, as illustrated by the general depiction of 16*a* and described further herein.

In an embodiment, the power system 13 incudes a power supply or converter 100 (hereinafter referred to as a power supply 100) as described herein for receiving power from a bus system, converting and routing power to various components in the aircraft 10. In one embodiment, and as described by way of example herein, the power supply 100 is a DC-to-DC converter. It shall be understood that the power supply 100 includes an input that can be connected to, for example, a DC bus that provide a relatively high-level voltage (e.g., 28/48V) and steps that voltage down to a much lower voltage (e.g., IV).

Figure 2:
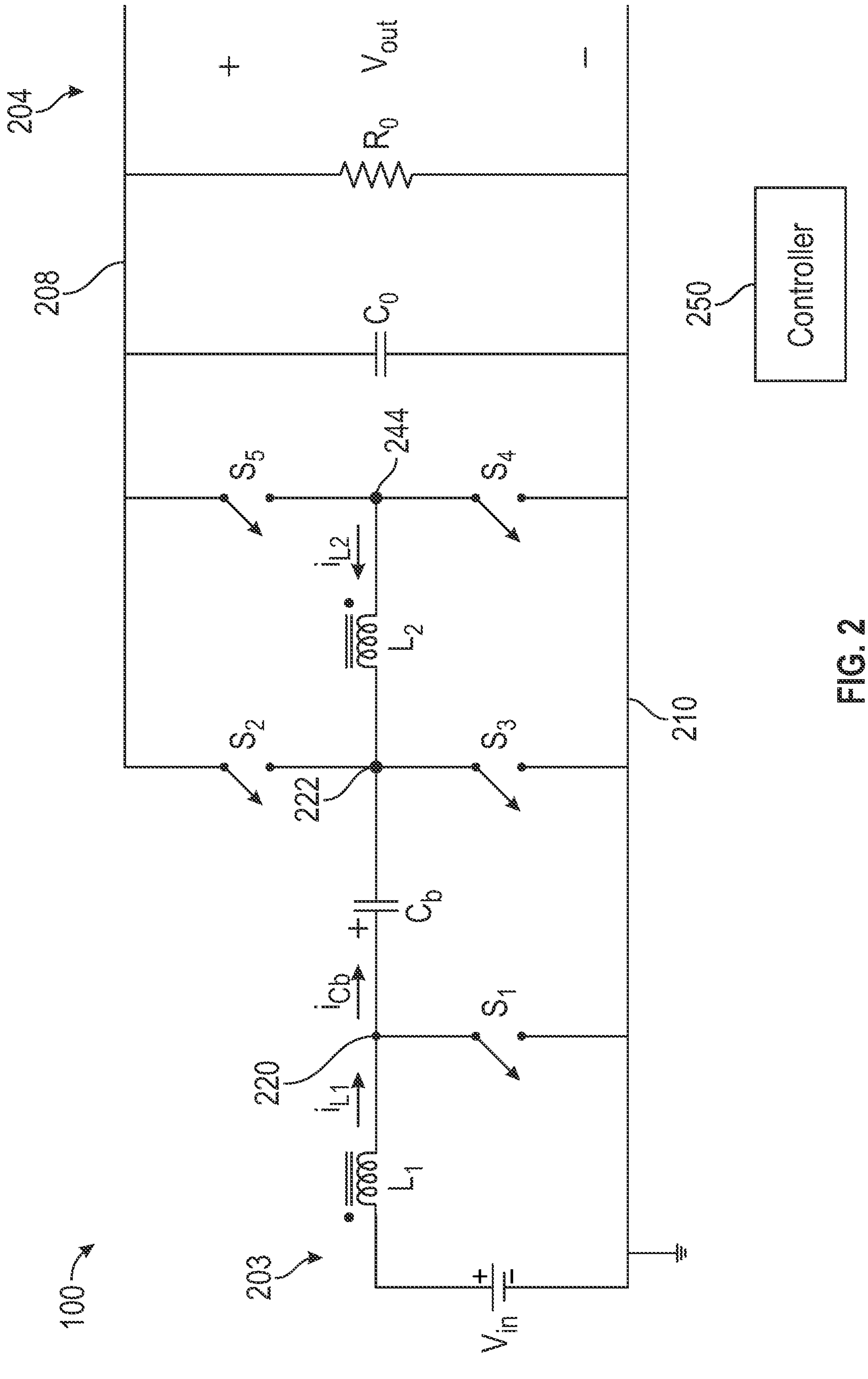
FIG. 2 depicts a simplified schematic diagram of an embodiment of a DC-to-DC power converter according to one embodiment.

With reference now to FIG. 2, an example of a DC-to-DC converter/power supply 100 is illustrate. Herein, the DC-to-DC converter/power supply 100 may be referred to as a converter 100 for brevity. The converter 100 provides an output across a load $R_o$. This output can be smoothed by an output capacitor $C_o$. $R_o$ and $C_o$ are not required for the circuit 100 but is envisioned that an end use will include them as in known in the art.

The converter 100 includes an DC input 203. The input 203 can be connected to a DC voltage source 202 labelled as $V_{in}$ herein. The source could be any source and, in one embodiment, is a DC bus of an aircraft.

The converter 100 also includes an output 204. The output 204 is labelled as $V_{out}$ in FIG. 2 and is shown as being provided across the output resistor $R_o$. The output voltage $V_{out}$. The magnitude of the output voltage $V_{out}$ can be based on a ratio of operating times (duty cycle) of the circuit as discussed below. As will be understood more fully from the below, $V_{out}$ can have a positive or negative value and a magnitude based on with the duty cycle defined by the on/off times of the two switches that can vary. $V_{out}$ is shown as being measured across output rails 208, 210. These rails can be referred to as positive rail 208 and output rail 210. Output rail 210 can also be referred to as ground for simplicity. Thus, as shown, the input 203 is between the positive side of $V_{in}$ and ground (e.g., output rail 210).

For completeness certain connections between the elements between the elements of the converter 100 will now be detailed. The operation of the converter 100 will then be explained with reference to FIGS. 3A-3C for inverting mode and FIGS. 4A-4C for non-inverting mode which show the different states/configurations of the converter 100. The circuit includes five switches, a first switch S1, a second switch S2, a third switch S3, a fourth switch S4 and fifth switch S5.

The circuit 100 includes a first inductor L1 having a first end connected to $V_{in}$. The other or second end of the first inductor L1 is connected to both the first switch S1 and a bypass capacitor $C_b$. The first switch S1 is connected between the second end of the first inductor L1 and ground. As will be further discussed below, the first switch S1 will be one of the "switched" switches in both modes (the others are the second switch S2 (non-inverting mode) and the third switch S3 (inverting mode)).

The bypass capacitor $C_b$ has a first side connected to the first inductor L1 and a second side connected to a second inductor L2. The bypass capacitor $C_b$ is shown as being serially connected between the first and second inductors L1, L2 and in particular, between nodes 220 and 222. The first and second inductors L1, L2 can be coupled inductors in one embodiment.

The second inductor L2 has first and second sides, respectively, connected to nodes 222, 224. The second switch S2 is connected between the positive output rail 208 and node 222. Thus, the second side of the bypass capacitor $C_b$ and the first side of the second inductor L2 can selectively be connected to the positive output rail 208.

The third switch S3 is connected between the second side of the bypass capacitor $C_b$ and the negative output rail 210. Thus, the second side of the bypass capacitor $C_b$ can selectively be connected to the negative output rail 210.

The fourth switch S4 is connected between the second side of the second inductor L2 (node 224) and the negative rail 210 and the fifth switch S5 is connected between the second side of the second inductor L2 (node 224) and the positive output rail 208. Thus, the second side of the second inductor L2 can be selectively connected to the positive output rail 208 or the negative output rail 210.

As shown S2/S3 are serially connected between the positive output rail 208 and the negative output rail 210 and can likewise selectively connect the first side of the second inductor L2 (second side of the bypass capacitor $C_b$) to the positive output rail 208 or the negative output rail 210.

For convenience, from time to time herein, nodes 220, 222 and 224 may be referred to as first, second and third nodes respectively.

Also shown in FIG. 2 is controller 250. The controller 250 controls the opening and closing of the switches S1-S5. As discussed further below, when in an inverting mode, S2 and S4 are held open (non-conducting or OFF) and S5 is closed (conducting or ON) and S1/S3 are alternatively toggled to set a duty cycle which controls whether the voltage is stepped up or down. When in a non-inverting mode, S3 and S5 are held open (non-conducting or OFF) and S4 is closed (conducting or ON) and S1/S2 are alternatively toggled to set a duty cycle which controls whether the voltage is stepped up or down.

Figure 3A:
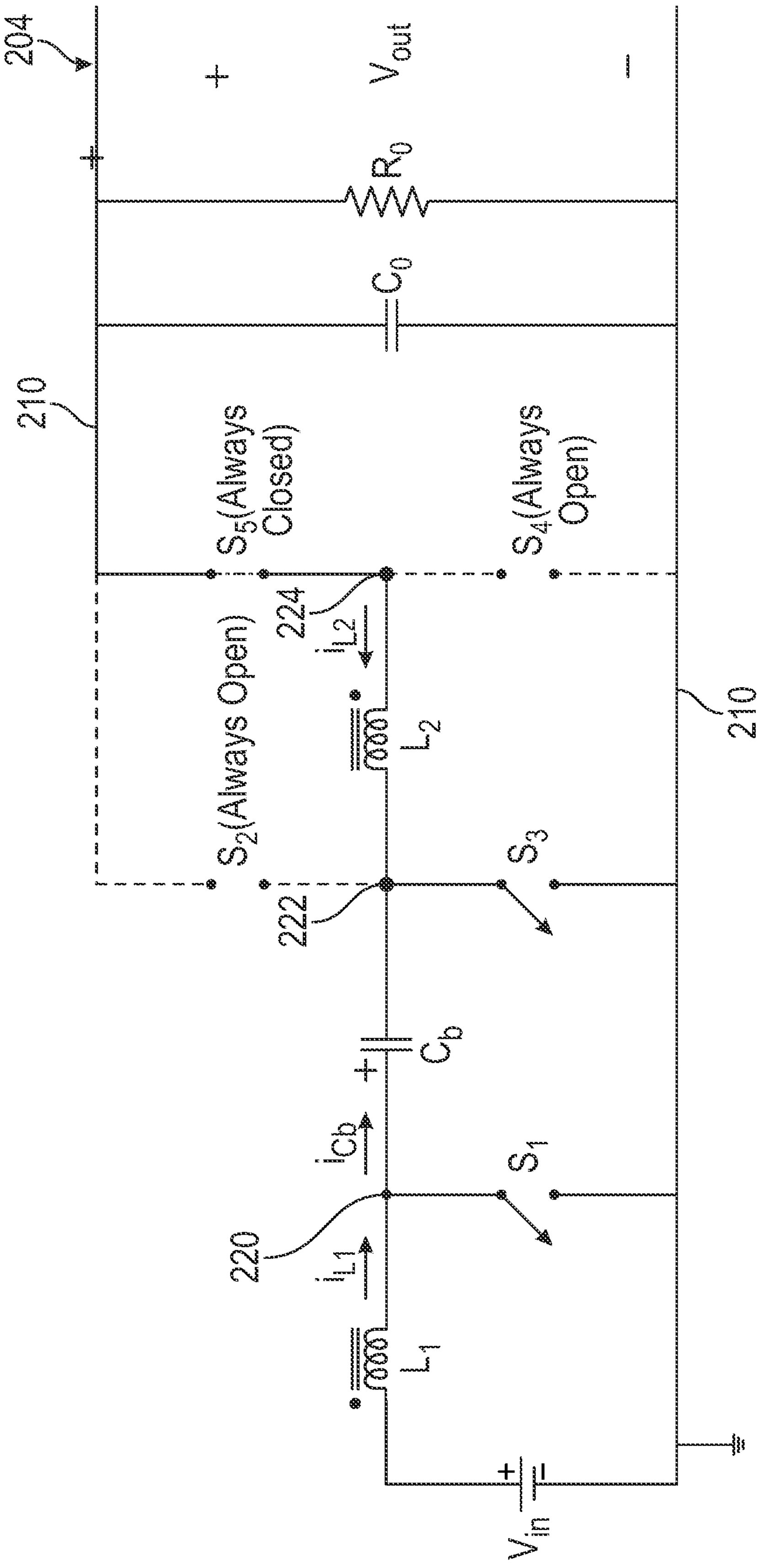
FIGS. 3A-3C depict the power converter of FIG. 2, in an inverting state.
Figure 3B:
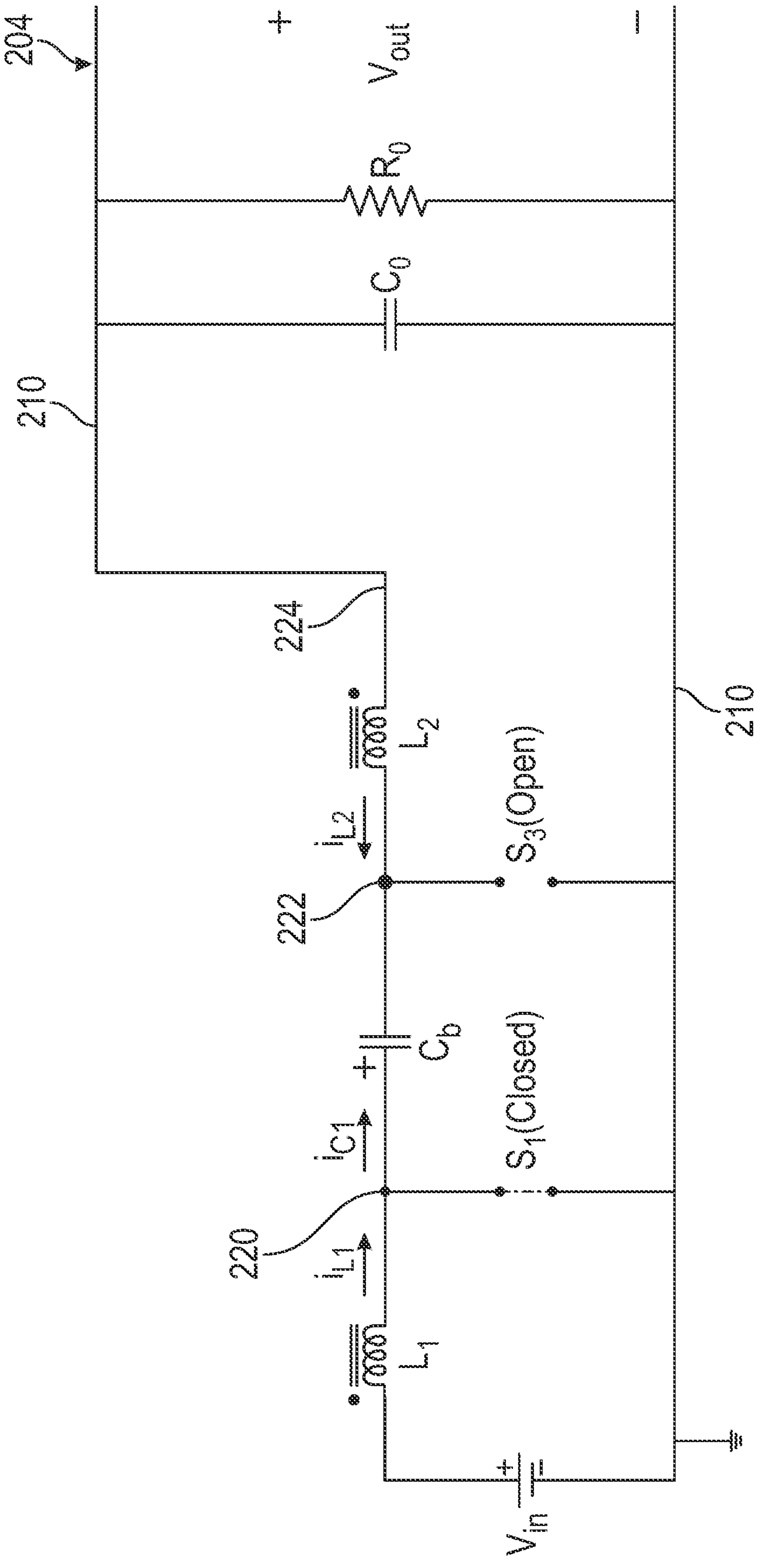
Figure 3C:
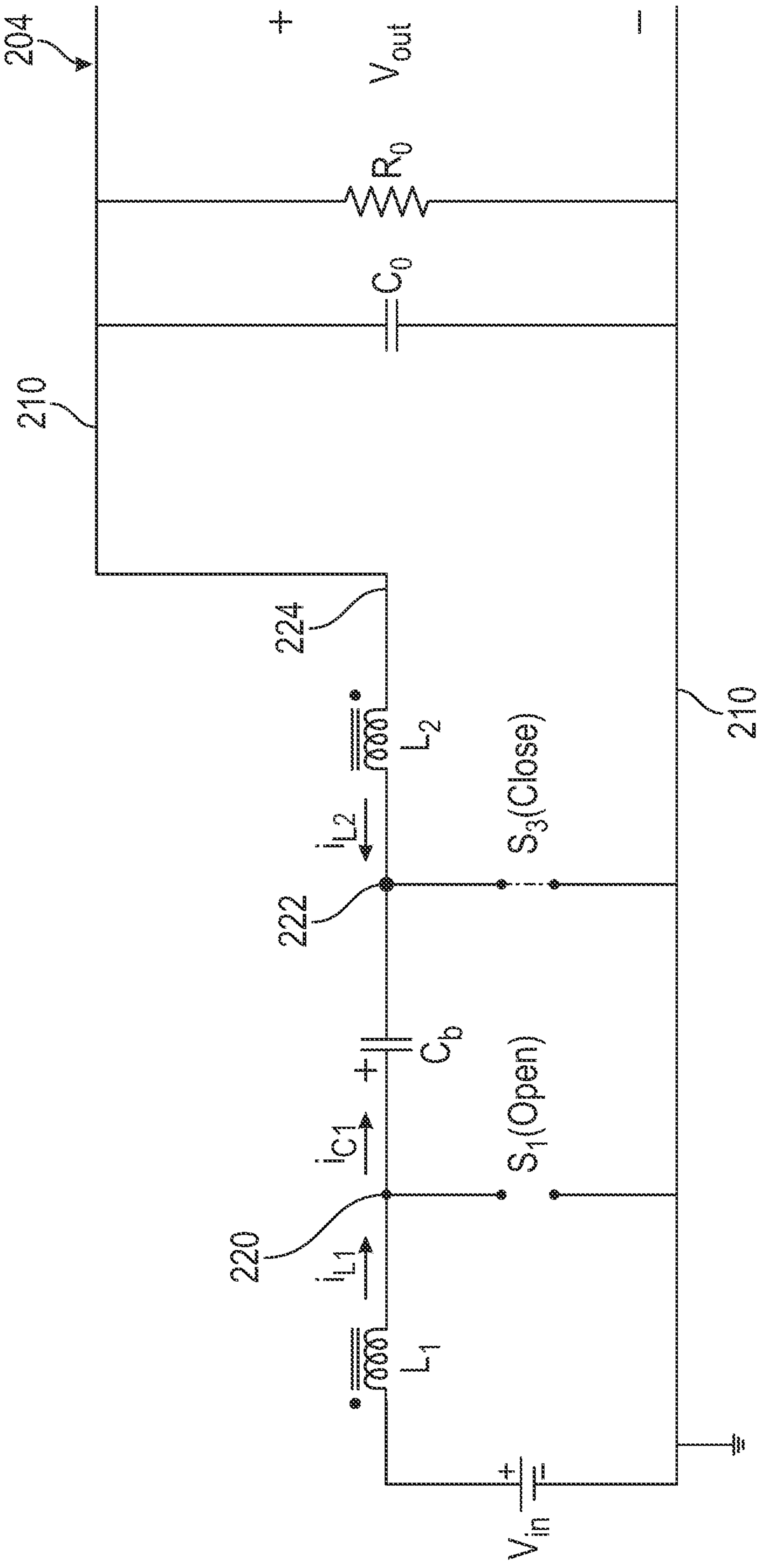

Reference will now be made to FIGS. 3A-3C. These figures show the circuit 100 when in an inverting mode that inverts the polarity of the input voltage. As noted above and shown in FIGS. 3A-3C, S2 and S4 are held open (non-conducting or OFF) and S5 is closed (conducting or ON). S1 and S3 operate in a complementary manner with one being open and one being closed. FIG. 3B shows an equivalent circuit with these conditions and where S1 is closed and S3 is open. Similarly, FIG. 3C shows an equivalent circuit where S1 is open and S3 is closed.

In the inverting mode, the relation between the input voltage $V_{in}$ and the output voltage $V_{out}$ is given as:

$$V_{out} = -V_{in}\frac{D}{1-D}$$

where D is the duty cycle. The duty cycle D is defined as the ratio of time in a cycle that S1 is conducting (FIG. 3B) relative to the time cycle (period). For step-down operation duty (D) will vary from 0 to 0.5. For step-up operation duty (D) will vary from 0.5 to 1. For example, consider a case where the switching frequency is 1000 Hz. Thus, the period would be 1 ms. For a step-down configuration with D equal 0.4, S1 would be on 0.4 ms and S3 would be on for 0.6 ms. This configuration will work like CUK converter. The EMI performance of this converter is better, because an inductor (the first inductor L1) is connected in series with the supply.

As shown in FIG. 3B, in a so-called turn-on condition, $S_1$ is closed and $S_3$ is open. The input supply Vin is connected through the first inductor $L_1$ to ground. A such, the first inductor L1 will store energy. Capacitor energy which is stored in the previous cycle is dissipated to load as well as the second inductor $L_2$. In FIGS. 3B and 3C, open switches and their connections to other elements are removed to simplify the circuit.

As shown in FIG. 3C in a so-called turn-off condition: $S_1$ is open and $S_3$ is closed. The energy stored in the first inductor $L_1$ is transferred to the bypass capacitor $C_b$. The energy stored in the second inductor $L_2$ is dissipated through the load resistor $R_o$. It shall be understood that the circuit alternates between the turn on and turn off conditions due to the complementary nature of switches S1/S3.

Figure 4A:
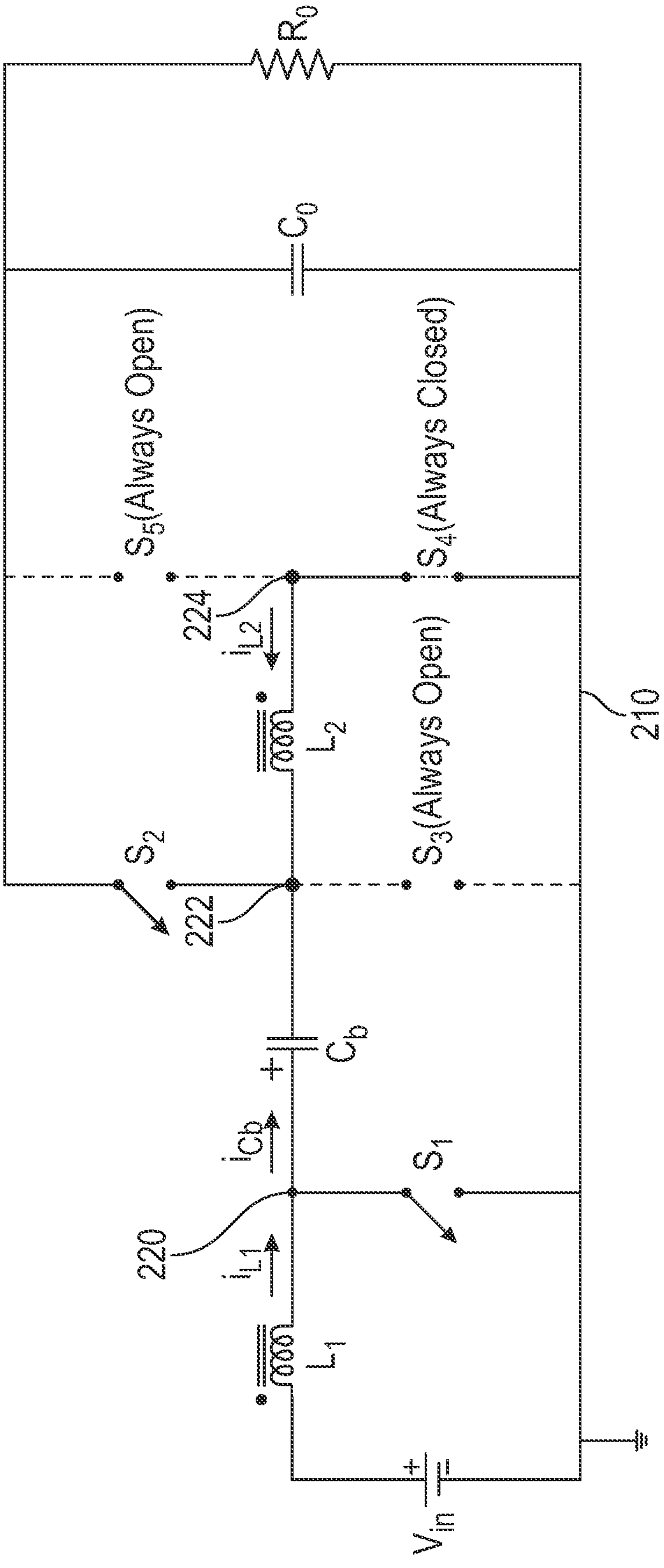
FIGS. 4A-4C depict the power converter of FIG. 2, in a non-inverting state.
Figure 4B:
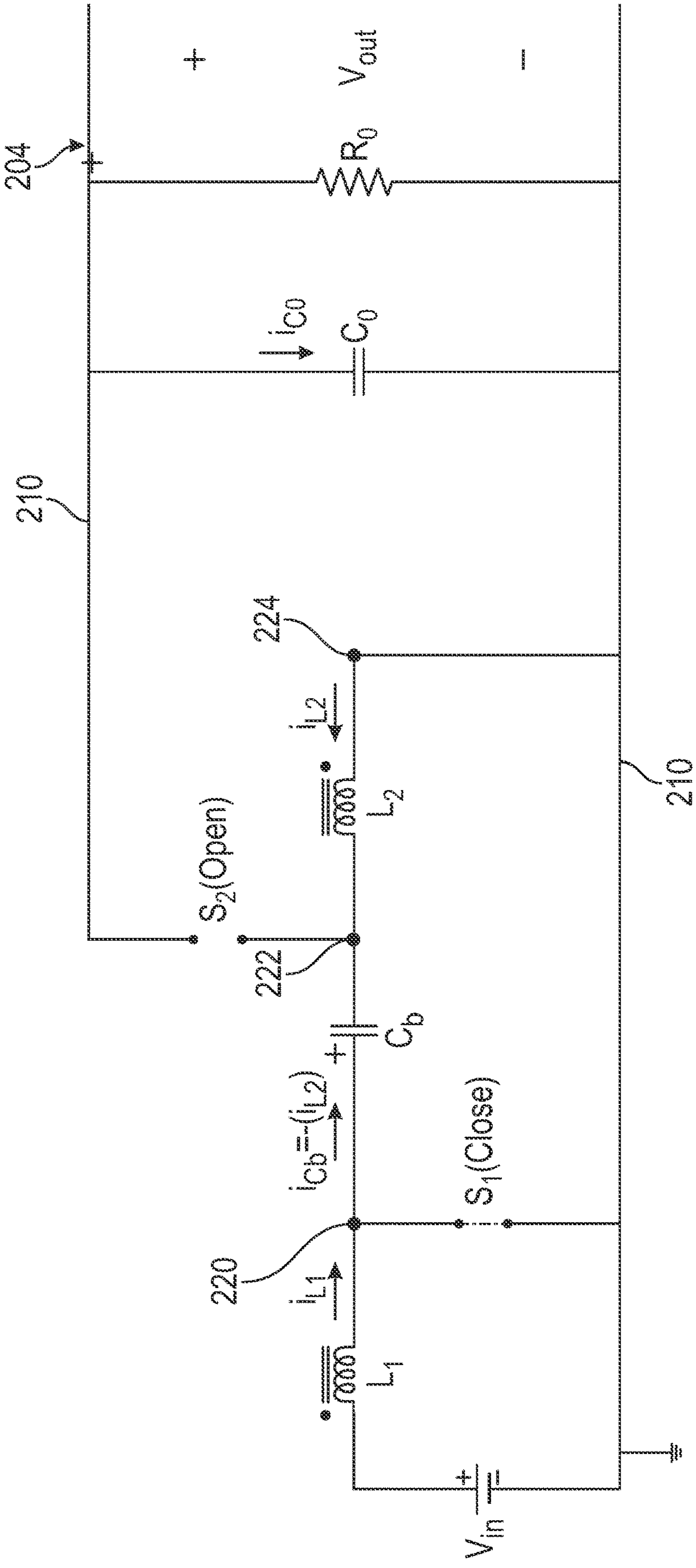
Figure 4C:
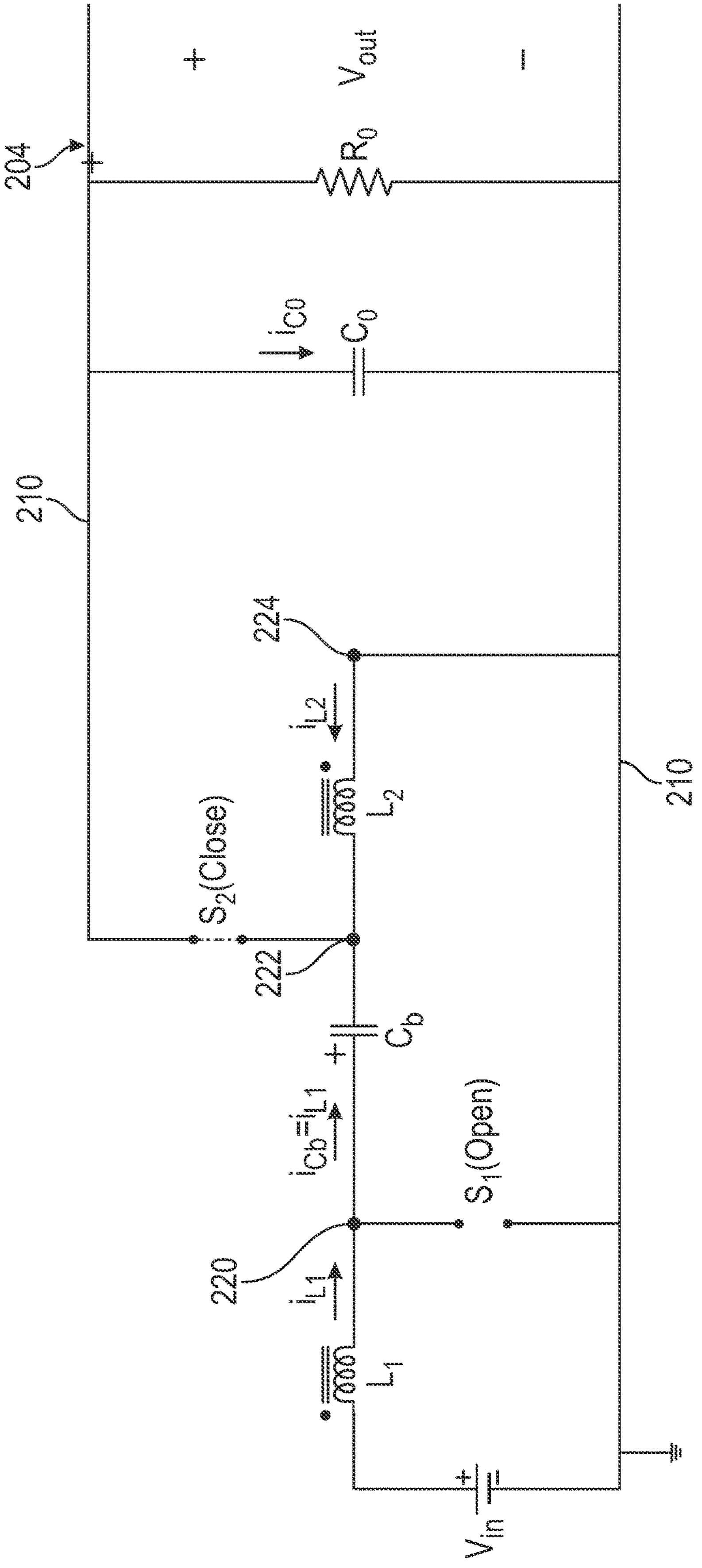

Reference will now be made to FIGS. 4A-4C. These figures show the circuit 100 when in a non-inverting mode where the polarity of the output voltage ($V_{out}$) matches the input voltage $V_{in}$. In this mode and as shown in FIGS. 4A-4C, S3 and S5 are held open (non-conducting or OFF) and S4 is closed (conducting or ON). S1 and S2 operate in a complementary manner with one being open and one being closed. FIG. 4B shows an equivalent circuit with these conditions and where S1 is closed and S2 is open. Similarly, FIG. 4C shows an equivalent circuit where S1 is open and S2 is closed.

In the non-inverting mode, the relation between the input voltage $V_{in}$ and the output voltage $V_{out}$ is given as:

$$V_{out} = V_{in}\frac{D}{1-D}$$

where D is the duty cycle. The duty cycle D is defined as above. For step-down operation the duty (D) will vary from 0 to 0.5. For step-up operation the duty (D) will vary from 0.5 to 1. For example, consider a case where the switching frequency is 1000 Hz. Thus, the period would be 1 ms. For a step-up configuration with D equal 0.6, S1 would be on 0.6 ms and S2 would be on for 0.4 ms. This configuration will work like SEPIC converter. The EMI performance of this converter is better, because the first inductor L1 is connected in series with the supply.

As shown in FIG. 4B, in a so-called turn-on condition, $S_1$ is closed and $S_2$ is open. The input supply Vin is connected through the first inductor L1 to ground. A such, the first inductor L1 will store energy. Capacitor energy which is stored in the previous cycle is dissipated to load as well as the second inductor $L_2$. In FIGS. 3B and 3C, open switches and their connections to other elements are removed to simplify the circuit.

As shown in FIG. 4C in a so-called turn-off condition: $S_1$ is open and $S_2$ is closed. The energy stored in the first inductor L1 is transferred to the bypass capacitor $C_b$. The energy stored in the second inductor $L_2$ is dissipated through the load resistor $R_o$. It shall be understood that the circuit alternates between the turn on and turn off conditions due to the complementary nature of switches S1/S2.

Tables 1 and 2 summarize operation of the inverting and non-inverting modes, respectively.

TABLE 1

| Inverting Mode | | | | | |
|---|---|---|---|---|---|
| Cycle/Switch | S1 | S2 | S3 | S4 | S5 |
| Ton | Closed | Open | Open | Open | Closed |
| Toff | Open | | Closed | | |

NOTE:
S1 and S3 are operating in complimentary manner

TABLE 2

| Non-Inverting Mode | | | | | |
|---|---|---|---|---|---|
| Cycle/Switch | S1 | S2 | S3 | S4 | S5 |
| Ton | Closed | Open | Open | Closed | Open |
| Toff | Open | Closed | | | |

NOTE:
S1 and S2 are operating in complimentary manner

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more features, integers, steps, operations, element components, and/or groups thereof. For the purposes of this disclosure, it is further understood that the terms "inboard" and "outboard" can be used interchangeably, unless context dictates otherwise.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

What is claimed is:

1. A DC-to-DC converter, the converter comprising:

an input configured to receive a DC input voltage from a DC voltage source;

an output having a positive rail and a negative rail, wherein the negative rail is configured for connection to a negative terminal of the DC input voltage source;

a bypass capacitor having first end connected to a first node and a second end connected to a second node;

two coupled inductors, the two coupled inductors including a first inductor that has a first end connected to the input and a second end connected to the first end of the bypass capacitor at the first node, the two coupled inductors also including a second inductor that has a first end connected to the second end of the bypass capacitor at the second node and a second end connected to a third node;

a first switch connected between the first node and the negative rail;

a second switch connected between the second node and the positive rail;
a third switch connected between the second node and the negative rail;
a fourth switch connected between the third node and the negative rail;
a fifth switch connected between the third node and the positive rail; and
a controller that is configured to selectively operate the first, second, third, fourth and fifth switches based on a desired magnitude and polarity of a voltage at the output;
wherein the controller is configured to operate in an inverting mode at a switching frequency having a period,
wherein in the inverting mode, the second and fourth switches are open, the fifth switch is closed and the first and third switches operate in a complementary manner during the period.

2. The converter of claim 1, wherein a portion of the period where the first switch is closed defines a duty cycle D.

3. The converter of claim 2, wherein when D is less than 0.5 a voltage at the input is stepped-down to a lower voltage at the output and when D is greater than 0.5 the voltage at the input is stepped-up to a higher voltage at the output.

4. The converter of claim 3, wherein a relationship between the DC input voltage ($V_{in}$) and the output voltage ($V_{out}$) is:

$$V_{out} = -V_{in}\frac{D}{1-D}.$$

5. A method of operating a power converter as recited in claim 1, the method comprising:
determining the power converter is to operate in the inverting mode; and
operating the power converter at the switching frequency.

6. The method of claim 5, wherein in the inverting mode, the second and fourth switches are open and the fifth switch is closed and the first and third switches operate in a complementary manner during the period.

7. The method of claim 6, wherein a portion of the period where the first switch is closed defines a duty cycle D and wherein when D is less than 0.5 a voltage at the input is stepped-down to a lower voltage at the output and when D is greater than 0.5 the voltage at the input is stepped-up to a higher voltage at the output.

8. The method of claim 7, wherein the relation between the DC input voltage ($V_{in}$) and the output voltage ($V_{out}$) is:

$$V_{out} = -V_{in}\frac{D}{1-D}.$$

9. The method of claim 5, wherein after determining, then determining that the power converter is to operate in a non-inverting mode, wherein in the non-inverting mode, the third and fifth switches are open and the fourth switch is closed and the first and second switches operate in a complementary manner during the period.

10. The method of claim 9, wherein a portion of the period where the first switch is closed defines a duty cycle D and wherein when D is less than 0.5 a voltage at the input is stepped-down to a lower voltage at the output and when D is greater than 0.5 the voltage at the input is stepped-up to a higher voltage at the output.

11. The method of claim 10, wherein a relationship between the DC input voltage ($V_{in}$) and the output voltage ($V_{out}$) is:

$$V_{out} = V_{in}\frac{D}{1-D}.$$

12. A DC-to-DC converter, the converter comprising:
an input configured to receive a DC input voltage from a DC voltage source;
an output having a positive rail and a negative rail, wherein the negative rail is configured for connection to a negative terminal of the DC input voltage source;
a bypass capacitor having first end connected to a first node and a second end connected to a second node;
two coupled inductors, the two coupled inductors including a first inductor that has a first end connected to the input and a second end connected to the first end of the bypass capacitor at the first node, the two coupled inductors also including a second inductor that has a first end connected to the second end of the bypass capacitor at the second node and a second end connected to a third node;
a first switch connected between the first node and the negative rail;
a second switch connected between the second node and the positive rail;
a third switch connected between the second node and the negative rail;
a fourth switch connected between the third node and the negative rail;
a fifth switch connected between the third node and the positive rail; and
a controller that is configured to selectively operate the first, second, third, fourth and fifth switches based on a desired magnitude and polarity of a voltage at the output;
wherein the controller is configured to operate in a non-inverting mode at a switching frequency having a period;
wherein in the non-inverting mode, the third and fifth switches are open, the fourth switch is closed and the first and second switches operate in a complementary manner during the period.

13. The converter of claim 12, wherein a portion of the period where the first switch is closed defines a duty cycle D.

14. The converter of claim 13, wherein when D is less than 0.5 a voltage at the input is stepped-down to a lower voltage at the output and when D is greater than 0.5 the voltage at the input is stepped-up to a higher voltage at the output.

15. The converter of claim 14, wherein a relationship between the DC input voltage ($V_{in}$) and the output voltage ($V_{out}$) is:

$$V_{out} = V_{in}\frac{D}{1-D}.$$

* * * * *